United States Patent [19]

Huang et al.

[11] Patent Number: 5,436,093
[45] Date of Patent: Jul. 25, 1995

[54] METHOD FOR FABRICATING CARBON/LITHIUM-ION ELECTRODE FOR RECHARGEABLE LITHIUM CELL

[75] Inventors: Chen-Kuo Huang, South Pasadena; Subbarao Surampudi, Glendora, both of Calif.; Alan I. Attia, Needham, Mass.; Gerald Halpert, Pasadena, Calif.

[73] Assignee: California Institute of Technology, Pasadena, Calif.

[21] Appl. No.: 56,058

[22] Filed: Apr. 30, 1993

[51] Int. Cl.⁶ ............................................. H01M 4/26
[52] U.S. Cl. .................................. 429/217; 429/218; 205/59; 427/122
[58] Field of Search ............... 429/217, 218; 205/57, 205/59; 427/122; 252/510

[56] References Cited

U.S. PATENT DOCUMENTS

| | | | |
|---|---|---|---|
| 4,304,825 | 12/1981 | Basu | 429/218 X |
| 4,517,265 | 5/1985 | Bélanger et al. | 429/217 |
| 4,814,242 | 3/1989 | Maxfield et al. | 429/217 |

Primary Examiner—Stephen Kalafut
Attorney, Agent, or Firm—Blakely, Sokoloff, Taylor & Zafman

[57] ABSTRACT

The method includes steps for forming a carbon electrode composed of graphitic carbon particles adhered by an ethylene propylene diene monomer binder. An effective binder composition is disclosed for achieving a carbon electrode capable of subsequent intercalation by lithium ions. The method also includes steps for reacting the carbon electrode with lithium ions to incorporate lithium ions into graphitic carbon particles of the electrode. An electrical current is repeatedly applied to the carbon electrode to initially cause a surface reaction between the lithium ions and to the carbon and subsequently cause intercalation of the lithium ions into crystalline layers of the graphitic carbon particles. With repeated application of the electrical current, intercalation is achieved to near a theoretical maximum. Two differing multi-stage intercalation processes are disclosed. In the first, a fixed current is reapplied. In the second, a high current is initially applied, followed by a single subsequent lower current stage. Resulting carbon/lithium-ion electrodes are well suited for use as an anode in a reversible, ambient temperature, lithium cell.

34 Claims, 6 Drawing Sheets

PROCESS FOR FORMING CARBON ELECTRODE FROM GRAPHITIC CARBON PARTICLES USING AN EPDM BINDER

| |
|---|
| 1. Mix 99.5%, by weight, graphitic carbon powder with 0.5%, by weight, Ethylene propylene diene monomer (EPDM) in solution of cyclohexane. |
| 2. Apply carbon/EPDM mixture to nickel grid substrate to form thin film. |
| 3. Allow film to dry. |
| 4. Press nickel substrate between stainless steel plates at ~450 lbs/in$^2$. |
| 5. Repeat steps 2-4 to achieve a carbon/EPDM film having a thickness of 10-15 mil and a loading of 10-15 mg/cm$^2$. |

FIG. 1

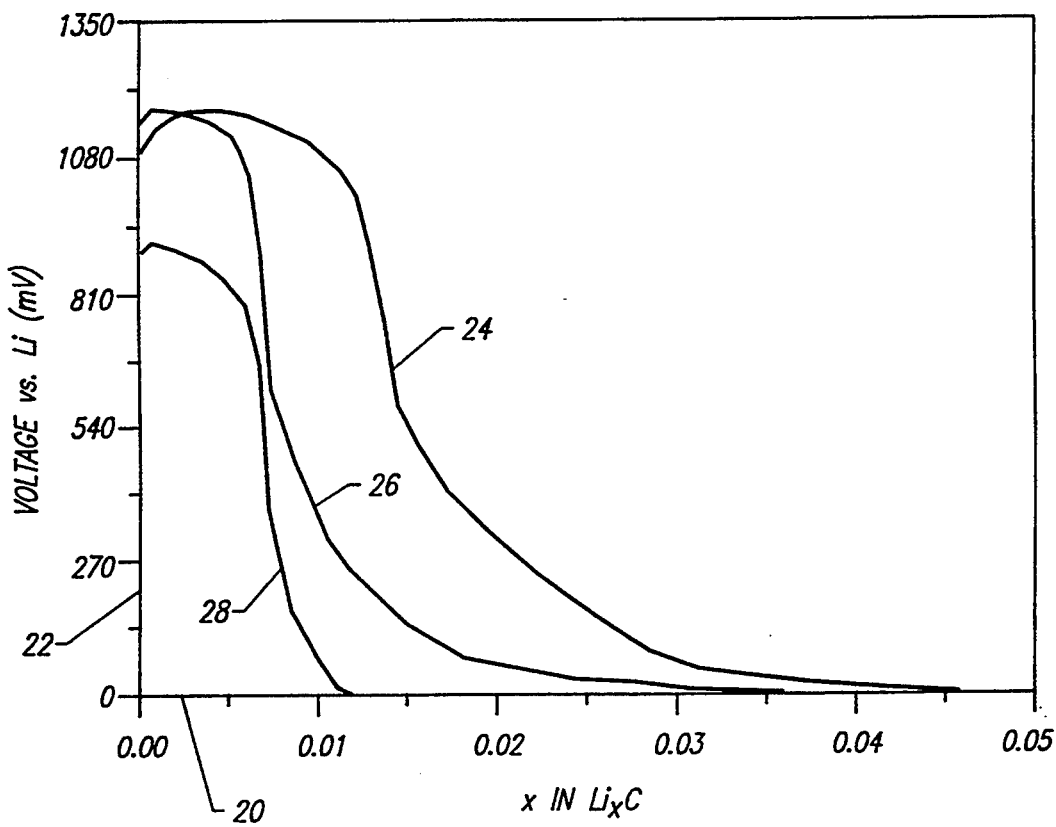

FIG. 2

INTERMITTENT PROCESS FOR INTERCALATING CARBON ELECTRODE WITH LITHIUM IONS

| |
|---|
| 1. Apply electrical current to carbon electrode disposed in electrolyte bath with lithium source to cause lithium ions to react with carbon electrode until a voltage v.Lithium drops from an open circuit voltage to near 0 volts. |
| 2. Deactivate current until voltage returns to stable open circuit voltage level. |
| 3. Repeat steps 1-2 with carbon electrode until the degree of intercalation of x in $Li_xC$ nears x=0.166. |

FIG. 7

TWO-STAGE PROCESS FOR INTERCALATING CARBON ELECTRODE WITH LITHIUM IONS

| |
|---|
| 1. Apply first electrical current to carbon electrode disposed in electrolyte bath with lithium source to cause lithium ions to react with the surface of the carbon electrode until a voltage v.lithium drops from an open circuit voltage to near 0 volts. Deactivate current until voltage returns to a stable open circuit voltage level. |
| 2. Apply lower electrical current to the carbon electrode to cause lithium ions to be intercalated into the carbon electrode until a voltage between the electrodes drops from the stable open circuit voltage to near 0 volts and until the degree of intercalation of x in $Li_xC$ nears x=0.166. |

FIG. 10

METHOD FOR FABRICATING CARBON/LITHIUM-ION ELECTRODE FOR RECHARGEABLE LITHIUM CELL

ORIGIN OF THE INVENTION

The invention described herein was made in the performance of work under a NASA contract, and is subject to the provisions of Public LAW 96-517 (35 USC 202) in which the Contractor has elected to retain title.

BACKGROUND OF THE INVENTION

1. Technical Field

The invention relates to lithium cells, and in particular to methods for forming lithium ion electrodes having graphitic carbon bases for use as an anode in a lithium cell.

2. Background Art

Lithium cells are being developed as replacements for conventional batteries, particularly for applications where high voltage, high capacity, low weight, and long shelf life is required. Moreover, unlike some conventional batteries, such as nickel cadmium batteries, which include component materials that may adversely affect the environment, lithium battery cells use component materials which are substantially less harmful.

Although lithium cells have numerous advantages over conventional batteries, the high chemical reactivity of lithium has caused problems in the fabrication and safe operation of the cells. For example, lithium is highly reactive with water and, if brought into contact with water, will ignite. Lithium can also be unstable when in contact with cell electrolytes. Moreover, after prolonged use, lithium cells can become unsafe due to the formation of lithium dendrites which can cause shorting within the cell.

Conventionally, the cell includes a pure lithium anode. To overcome problems associated with pure lithium electrodes, it has been proposed to replace the conventional electrode base material, with an alternate material having a greater stability with respect to the cell electrolytes. To be effective, the alternate material should exhibit low equivalent weight and low voltage versus lithium. Carbon is a candidate for alternate anode material since it possesses the above-mentioned properties. To function as the anode of a lithium cell, lithium ions must be incorporated into the carbon, thereby producing a carbon/lithium-ion anode.

Although some success has been achieved in developing carbon/lithium-ion anodes, problems remain which have heretofore prevented the attainment of the full advantages of carbon/lithium-ion anodes. Generally, a carbon/lithium-ion anode is fabricated by first forming a carbon electrode from graphitic carbon, then reacting the carbon electrode with lithium to cause lithium ions to be incorporated into the graphitic carbon. Problems occur in both fabrication steps. To properly allow for subsequent reaction with lithium, a carbon material having an optimal surface area must be employed. If either too great or too little carbon surface area is available, an effective lithium ion electrode can not be formed. Moreover, graphitic carbon particles must be tightly bound together to prevent the particles from dissolving or dispersing once placed within an electrolyte bath. One fabrication method involves compacting the particles at high temperatures and pressures. However, sintering occurring at the high temperatures and pressures renders the carbon electrode less desirable and causes changes to the carbon surface properties which prevent subsequent reaction with lithium. Accordingly, an ambient temperature fabrication method is preferred. For ambient temperature fabrication, a binder material must be provided to hold the carbon particles together. However, if too much binder is provided with the graphitic carbon, low specific energy, poor rate capability and inadequate lithium reaction occurs. Conversely, if an insufficient amount of binder is provided, the graphitic carbon particles tend to disperse or dissolve within the electrolyte bath. In general, the ratio of the binder material weight to the total carbon surface area is an important factor.

Once a suitable carbon electrode is formed, difficulties arise in incorporating lithium ions into the carbon anode. To incorporate lithium ion, a carbon electrode is typically immersed within an electrolyte bath with a lithium ion source which may be a lithium-containing electrode such as a piece of lithium metal, lithiated titaninum disulfide $TiS_2$, or lithiated cobalt oxide. A current is applied between the lithium source and carbon electrodes. Lithium ions, drawn from the lithium source, react with the carbon electrode. To achieve reversible incorporation of the lithium ions into the carbon, the carbon must become intercalated with lithium ions, i.e., lithium ions must become loosely bonded between layers of carbon atoms within the graphitic carbon crystals. It has been found that conventional techniques for reacting lithium ions with graphitic carbon do not achieve reversible intercalation. Rather conventional techniques merely achieve a surface reaction between the lithium ions and the carbon electrode. Carbon electrodes which have undergone only a surface reaction with lithium ions do not allow reversible reactions with lithium ions. Hence, a lithium battery cell incorporating such a non-reversible carbon electrode is not rechargeable.

Heretofore, no effective techniques have been developed for forming carbon electrodes and for subsequently reacting the carbon electrodes with lithium to properly intercalate the electrode with lithium ions.

SUMMARY OF THE INVENTION

From the foregoing it can be appreciated that there is a need to provide improved methods for forming carbon electrodes and for reacting carbon electrodes with lithium ions to properly intercalate the carbon with lithium ions. These objects and other general advantages of the invention, are achieved by the invention.

In accordance with a first aspect of the invention, a carbon electrode composition of about 99.5%, by weight, carbon and 0.5%, by weight, ethylene propylene diene monomer (EPDM) binder is used. A method for fabricating a carbon electrode from carbon and EPDM for use in forming a carbon/lithium-ion anode for a lithium cell is also provided. The improved method includes the steps of a) mixing graphitic carbon powder with a solution containing EPDM binder, b) forming a film of said graphitic carbon/EPDM mixture on a substrate material, c) allowing said film to dry substantially, d) applying pressure to said film, and e) repeating steps b-c until a desired lending of carbon-/EPDM film is achieved.

Preferably, the steps of forming the film, allowing the film to dry, and applying pressure are repeated until about 10-15 milligrams per $cm^2$ of said carbon/EPDM mixture is formed to a depth of about 10-15 mil on the substrate. Pressure is applied to the film at about 450 lbs/in$^2$.

The use of a 0.5%, by weight, EPDM binder allows for adequate cohesion of the graphitic carbon particles while also allowing for an effective subsequent intercalation of lithium ions into the carbon. Moreover, by applying a pressure to the carbon/EPDM layers provided on the substrate, the formation of subsequent layers does not damage preexisting layers, a problem which can occur if pressure is not applied. Hence, several layers of the carbon/EPDM material may be applied to a substrate material to achieve a desired loading of carbon/EPDM. Although a composition of 0.5% EPDM is optimal, a composition of up to 1% EPDM may also be effective for binding the carbon. In general, the most effective percentage of EPDM depends on the total surface area of the graphitic carbon.

In accordance with a second aspect of the invention, methods for incorporating lithium ions into a carbon electrode are provided. The methods generally comprise the steps of: a) applying a first electrical current to a carbon electrode disposed in a electrolyte bath with a lithium source, with the current being selected to cause a surface reaction of the carbon with lithium ions drawn from the lithium source; b) deactivating the current; and c) are repeating steps a) and b) a sufficient number of times to cause the carbon to become intercalated with lithium ions.

In one embodiment of the general lithium ion incorporation method, herein referred to as an intermittent method, the first and second current levels are at about the same current level. The current is deactivated and reapplied several times, with each subsequent reapplication of current causing greater reaction with lithium ions ultimately resulting in reversible intercalation. In a second embodiment, herein referred to as a two-stage method, the second current level is substantially lower than the first current. The second current is applied once to achieve substantial intercalation of lithium ions. In either of the first or second embodiments, lithium ion reaction proceeds until intercalation occurs yielding a composition of Li$_x$C wherein x is near 0.16. In the first embodiment, four or more steps are required to achieve substantially full intercalation. In the two stage method, substantially full intercalation is achieved in two stages.

In general, more than one application of the current is provided since a single application of current merely causes a surface reaction of lithium ions with the carbon. As discussed above, a carbon electrode undergoing only a surface reaction with the lithium does not reach a reversible state such that it can be employed as an anode within a rechargeable lithium cell. However, by repeating the application of current, a reversible, rechargeable carbon/lithium-ion electrode is achieved.

Preferably, the methods for reacting lithium with carbon are applied to a carbon electrode formed in accordance with the first aspect of the invention, wherein a 0.5% EPDM binder composition is used in conjunction with the repeated application of pressure to form a carbon electrode.

In its various embodiments, the invention provides effective methods for fabricating carbon/lithium-ion electrodes for use as anodes in rechargeable battery cells. The principals of the invention, as they relate to the fabrication of electrodes using the EPDM binder, may be advantageously applied to the fabrication of cathode electrodes as well, particularly titanium disulfide, TiS$_2$, anodes. The principals of the invention, as they relate to the intercalation of an anode with lithium ions, may be applied to anode materials other than carbon, including magnesium silicide, Mg$_2$Si.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a flow chart illustrating a method of fabricating a carbon electrode employing EPDM as a binder material for binding graphitic carbon particles.

FIG. 2 is a graph illustrating the effect of the amount of EPDM binder in a carbon electrode on the subsequent reaction of lithium ions and the graphitic carbon.

FIG. 7 is a flow chart illustrating an intermittent method of intercalating a carbon electrode with lithium ions, wherein a fixed electrical current level is repeatedly applied to a carbon electrode in the presence of lithium ions.

FIG. 10 is a flow chart illustrating a two-stage method for intercalating lithium ions into a carbon electrode, wherein a lower electrical current is applied after an initial reaction stage.

DETAILED DESCRIPTION OF THE INVENTION

Figure 3:
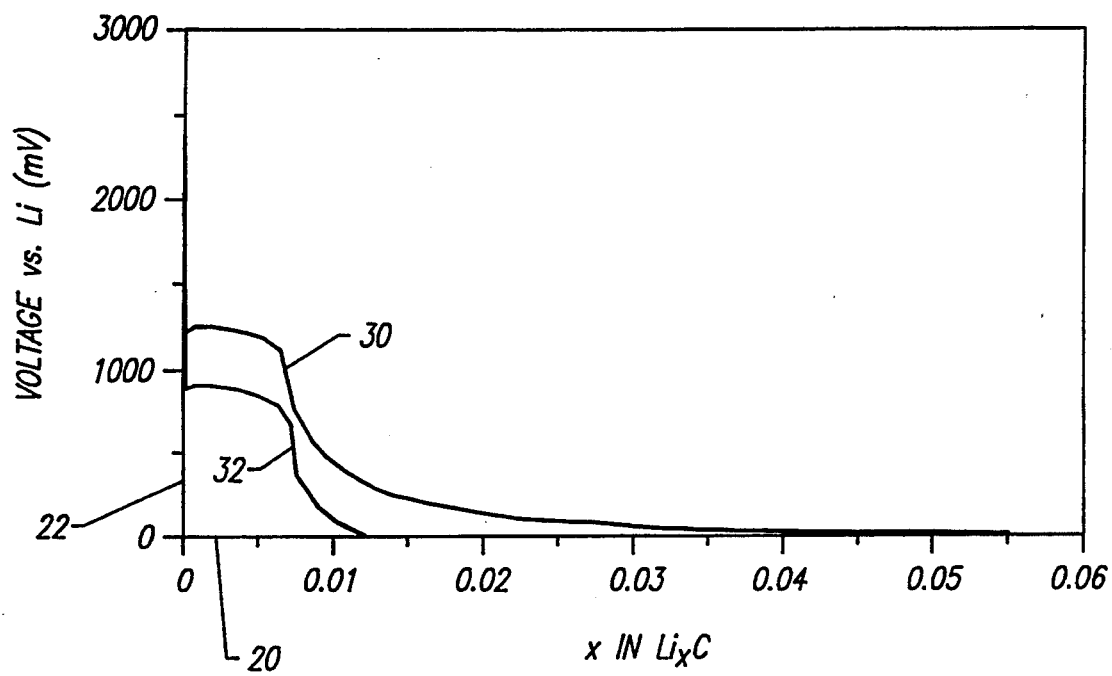
FIG. 3 is a graph illustrating a comparison of the effect of the EPDM binder amount on the electrochemical reaction of the lithium and graphitic carbon for a 2% and 3% EPDM composition.

Methods for fabricating carbon electrodes and for subsequently intercalating lithium ions into the carbon electrodes are described herein.

Referring to FIGS. 1–6, a preferred method for fabricating a carbon electrode for subsequent use as a carbon/lithium-ion anode in a lithium cell will now be described. FIG. 1 illustrates steps of the fabrication method. Initially, at step 1 a graphitic carbon powder is mixed with 0.5%, by weight, ethylene propylene diene monomer (EPDM) within cyclohexane until a uniform slurry is obtained. At step 2, the carbon/EPDM slurry is coated onto both sides of a nickel grid. The coating may be achieved by a number of conventional techniques, including dipping the nickel grid into the slurry.

The nickel grid acts as a support and current collector for subsequent lithium intercalation steps, described below. Other suitable substrate materials may be used.

At step 3, the carbon/EPDM coating is dried by allowing the cyclohexane to evaporate. At step 4, both sides of the nickel grid are pressed between a pair of stainless steel plates, to a pressure of about 450 lbs/in$^2$. Pressure is applied for about 30 seconds to 2 minutes. Steps 2, 3 and 4 are repeated as many times as desired to add additional layers of the carbon/EPDM material to the nickel grid. Preferably, the steps are repeated a sufficient number of times to yield an overall carbon/EPDM thickness of 10–15 mil, having a material loading of 10–15 mg/cm$^2$.

The initial selection of a carbon/EPDM composition of 99.5% carbon and 0.5% EPDM achieves an effective carbon composition for commercial-grade graphitic carbon. The fabrication steps are performed at room or ambient temperature, hence, no high temperatures are required and no sintering of the carbon occurs. A smaller percentage of the EPDM binder is generally insufficient to adequately bind the carbon particles, and, during subsequent attempts to intercalate with lithium ions, the graphitic carbon disperses. Greater amounts of binder material typically cause a degradation of the performance of the electrode, including a degradation in the ability of the electrode to be intercalated with lithium ions.

The method steps shown in FIG. 1 help ensure that a desired amount of carbon/EPDM can be loaded onto the nickel substrate. In particular, it was found that in previous techniques that did not employ cold-pressing steps a first layer of the carbon/EPDM material was partially worn away upon the application of a second layer. However, it was found that by cold-pressing the nickel plate to about 450 lbs/in$^2$, additional layers of carbon/EPDM material may be added to the substrate without degrading previously deposited layers.

The efficacy of a carbon/EPDM composition having 0.5% EPDM, by weight, is illustrated in FIGS. 2–6. These figures provide the results of experiments conducted with various EPDM/carbon ratios. Specifically, EPDM binder compositions in the range of 0.5% to 3% by weight, were investigated, and resulting discharge and charge curves are illustrated in the figures. To perform the experiment, electrochemical cells were constructed using electrodes fabricated in accordance with the above described method, lithium foil, porous polypropylene separators (Celgard no. 2400), and a 1.5M solution of LiAsF$_6$ in a 10:90 mixture by volume of EC and 2-MeTHF.

The electrodes were assembled using spiral wound cell configuration with the cells stack held by a glass vial with teflon mendra in the center. To determine voltage as a function of composition, cells were charged and discharged at constant current under ambient temperature conditions. Experiments were conducted in an oxygen and moisture free dry box.

FIG. 2 illustrates the effect of the percent amount of EPDM binder on the reaction of lithium-ions with graphitic carbon. In FIG. 2, voltage versus lithium in millivolts is charted as a function of the value of x in Li$_x$C for 0.5%, 1% and 3% EPDM compositions for discharge curves. In FIG. 2, axis 20 illustrates the amount of x in Li$_x$C. With no more than one lithium ion being bindable with six carbon atoms, the theoretical maximum achievable value for x is 1/6 or 0.166. Hence, value of x=0.166 corresponds to a composition of LiC$_6$ throughout the electrode material. Axis 22 illustrates the voltage of the carbon electrode versus lithium, in millivolts. Reference numerals 20 and 22 are used throughout the figures to identify graph axes.

Curve 24, of FIG. 2, illustrates the voltage versus lithium as a function of x for a 0.5% EPDM mixture. Curve 26 illustrates the same for a 1% EPDM mixture and curve 28 illustrates the same for a 3.0% EPDM mixture. The results provided in FIG. 2 were achieved by placing a carbon electrode, formed in accordance with the steps of FIG. 1, in an electrolyte bath with a lithium source. A current was applied between the lithium source and the carbon electrode thereby enabling lithium ions to be drawn from a lithium source to the carbon electrode. The discharge curves were obtained using the first stage of a two stage technique, described below.

As discussed above in the background of the invention, lithium ions can be incorporated into the carbon either by a surface reaction with the carbon or by an intercalation of the lithium ions into crystalline layers of carbon atoms. Surface reaction of lithium ions does not allow for reversible reactions. Hence, a carbon electrode undergoing only surface reactions with lithium ions can not be effectively used as an anode of a rechargeable lithium cell. However, the intercalation of the lithium ions into the carbon can be reversed, thereby providing a rechargeable lithium cell. Surface reactions of lithium ions and carbon atoms are generally referred to as stage 1 reactions. The intercalation of the lithium ions into the carbon is generally referred to as a stage 2 reaction.

For some EPDM binder composition percentages, an intercalation threshold exists beyond which stage 2 reactions occur. For an EPDM binder composition of 0.5%, stage 2 reactions generally do not occur until x reaches a 0.046. With x below 0.046, only non-reversible surface reactions have occurred. For a binder composition of 1%, the intercalation threshold is about x=0.0375. For other EPDM binder compositions, little or no intercalation occurs. Hence, for some compositions there is no intercalation threshold. As can be seen in FIG. 2, a carbon/EPDM compound employing 0.5% EPDM reached the 0.5% intercalation threshold of x=0.046, and a 1% EPDM reached intercalation threshold of x=0.0375.

For the experiment illustrated FIG. 2, a relatively low current level of 0.188 milliamperes/cm$^2$ was used for the deposition for the 3% EPDM material. In general, lower current produces greater reaction, yielding higher value for x. However, lower currents cause the reaction to proceed more slowly. FIG. 2 illustrates that even at the relatively low current, very little lithium ion reaction was achieved for a 3% EPDM composition. Curves 24 and 26 of FIG. 2 were determined by applying a current of 0.224 milliamperes/cm$^2$. FIG. 2 illustrates the advantages achieved using an EPDM composition of 0.5%, rather than higher percentage compositions.

FIG. 3 illustrates a comparison of the effect of EPDM binder amount on the electrochemical intercalation of lithium ions into graphitic carbon for a relatively low current level of 0.188 milliamperes/cm$^2$. The graph of FIG. 3 is similar to that of FIG. 2, but covers a greater x-range. Also, FIG. 3 illustrates a 2% EPDM composition, not shown in FIG. 2 In FIG. 3, only the 2% and 3% EPDM compounds are illustrated. In FIG. 3, the 2% EPDM curve is identified by reference numeral 30, whereas the 3% EPDM curve is identified by reference numeral 32. FIG. 3 verifies that a 2% EPDM composition achieves greater lithium ion reaction than a 3% composition. Nevertheless, even with 2% EPDM, very little intercalation was found to occur. The 2% EPDM curve was obtained using a two-step intercalation process described below.

Figure 4:
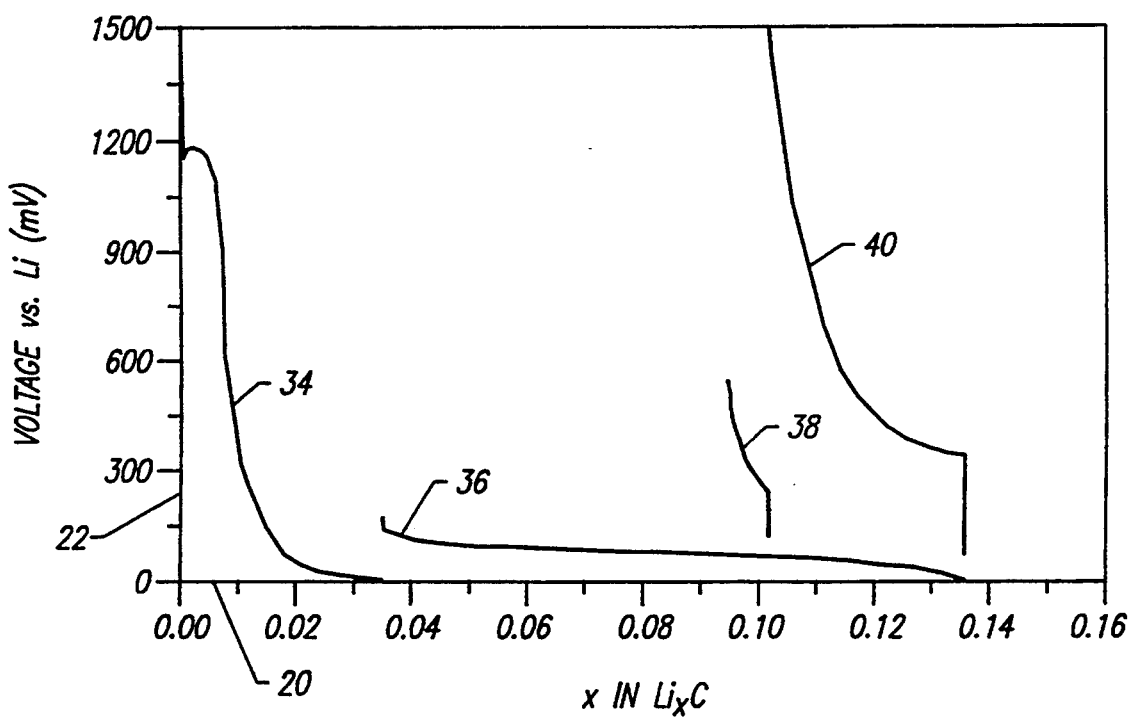
FIG. 4 is a graph illustrating the electrochemical intercalation of the lithium into graphitic carbon for a 1% EPDM composition.

FIG. 4 illustrates the electrochemical intercalation and de-intercalation of lithium ions into graphite for a 1% EPDM composition for various charging and discharging current levels. Curve 34 represents the discharge curve for a current of 0.224 milliamperes/cm². The discharge curve illustrates the degree to which lithium ions were incorporated into the graphitic carbon/EPDM mixture. Curve 34 barely reached the 1% EPDM intercalation threshold of $x=0.0375$. Curve 36 illustrates a second reaction step wherein a lower current of 0.0389 milliamperes/cm² was applied. As can be seen, during the second step incorporation of lithium continued well beyond the 1% intercalation threshold of $x=0.0375$ to nearly a value of $x=0.14$, but well short of the theoretical limit of $x=0.166$. Curve 40 illustrates a charging curve for a current of 0.5 milliamperes/cm², i.e., curve 40 illustrates the degree to which lithium ions were extracted from the graphitic carbon/EPDM after the prior intercalation of curve 36. Curve 38 illustrates a subsequent charge curve at a current of 0.0389 milliamperes/cm². Thus, curves 38 and 40 illustrate the "reversible capacity" of the electrode employing a 1% EPDM binder composition. A fairly limited range of reversibility is achieved. Hence, although intercalation is achieved up to $x=0.14$, the actual reversible capacity is within a much narrower range. Thus, although 1% EPDM can be used to achieve a reversible cell, 1% is not an optimal EPDM binder percentage.

Figure 5:
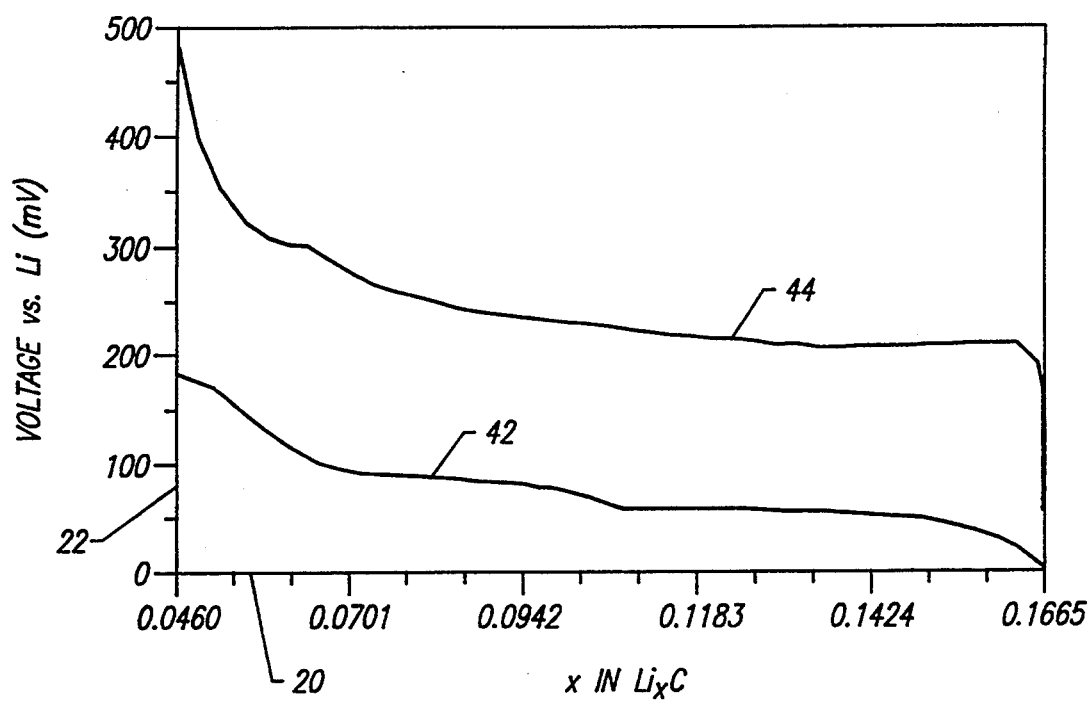
FIG. 5 is a graph illustrating the electrochemical intercalation and deintercalation of the lithium ions into and out of graphitic carbon.

FIG. 5 illustrates electrochemical intercalation and deintercalation curves for lithium ions into and out of a graphitic carbon compound having a 0.5% EPDM composition. Curve 42 is a discharge curve illustrating the incorporation of lithium into graphitic carbon at a electrical current of 0.0389 milliamperes/cm². Curve 44 illustrates a charging curve wherein lithium ions are extracted from the graphitic carbon at an electrical current of 0.158 milliamperes/cm². As can be seen from FIG. 5, the 0.5% EPDM compound easily reached near the theoretical maximum intercalation level of $x=0.166$. Hence a full range of reversible capacity was achieved. The reversible capacity is verified by curve 44 which illustrates the extraction of lithium ions from the lithiated graphitic carbon material. As can be seen, lithium ions were extracted down to the 0.5% EPDM intercalation threshold of $x=0.046$. As noted above, with x below 0.046, lithium ions are irreversibly bound to surface carbon atoms. Hence, these lithium ions cannot be extracted. Accordingly, FIG. 5 verifies that a full range of stage 2 lithium ion reversible capacity was achieved using a EPDM binder compound of 0.5%. The discharge curve 42, illustrates the second step of a two-step method described below. Initial discharge occurring between $x=0$ and $x=0.046$ is not shown in FIG. 5.

Figure 6:
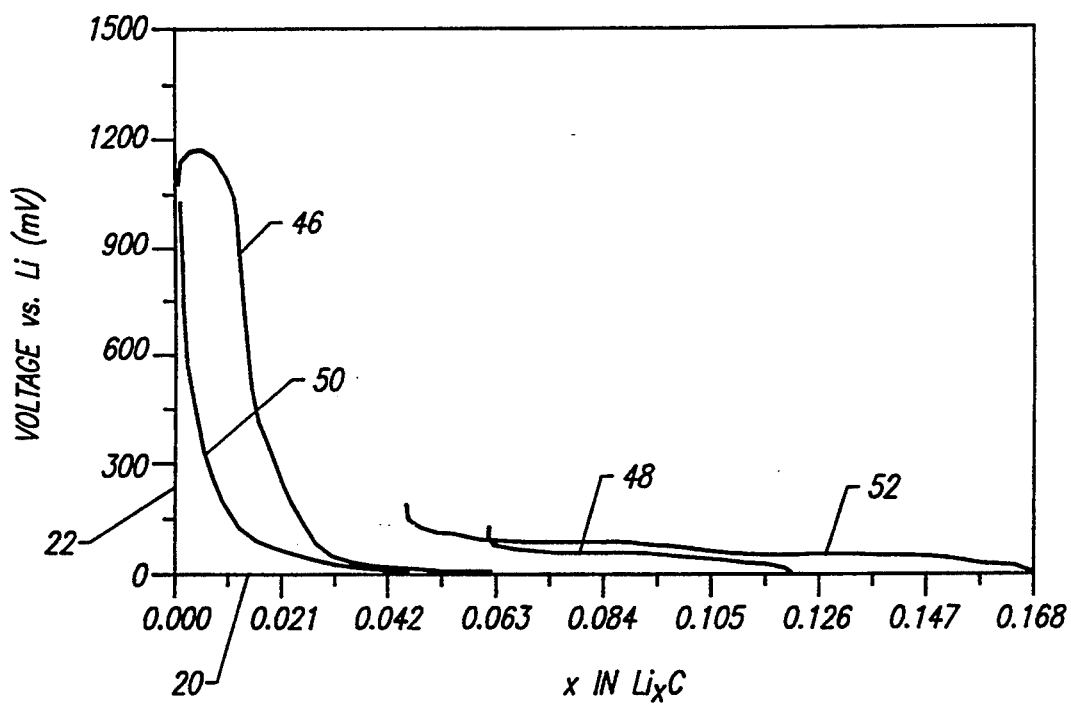
FIG. 6 is a graph illustrating the electrochemical intercalation of lithium into graphite for tightly and loosely packed carbon electrodes.

FIG. 6 illustrates the electrochemical reaction of lithium ions with graphitic carbon with an EPDM binder of 0.5%, by weight for loose and tight electrode stacking pressures. Lithium cyclability or reversibility is found to strongly depend on electrode stacking pressure. As a practical matter, the physical structure containing the lithium anode determines the amount of pressure which can be applied to the carbon/lithium-ion cathode. FIG. 6 illustrates differences between relatively high pressure stacking and relatively low pressure stacking. For the experiment of FIG. 6, a carbon/lithium-ion electrode was twisted into a spiral configuration prior to immersion in an electrolyte bath. Curves 46 and 52 illustrate first and second step discharge curves, respectively, for a tightly wound electrode. Curves 50 and 48 illustrate the first and second step discharge curves, respectively, for a loosely wound electrode. As can be seen, the loosely wound electrode did not achieve full reversible capacity, even though 0.5% EPDM was employed. For the experiment illustrated in FIG. 6, the first step discharge currents were 0.224 milliamperes/cm² whereas the second step discharge currents were 0.0389 milliamperes/cm². The graphitic carbon electrode included an EPDM binder composition of 0.5%. FIG. 6 provides verification that tightly wound electrodes achieve better performance.

Table I provides rate capability information for a lithium cell incorporating a 0.5% EPDM/carbon-based electrode. In a 1 ampere-hour cell, a C/20 discharge rate and a C/3 charge rate is achieved while maintaining a capacity greater than 200 mAh/gram, where 20 and 3 indicate 20 and 3 hours respectively.

TABLE I

| CURRENT (mA) | CAPACITY (mAh) |
| --- | --- |
| D 26 | 783 |
| C 50 | 789 |
| D 26 | 791 |
| C 100 | 763 |
| D 50 | 728 |
| C 50 | 741 |
| D 50 | 734 |
| C 100 | 716 |
| D 50 | 714 |
| C 200 | 697 |
| D 50 | 710 |
| C 300 | 670 |

FIGS. 2–6 illustrate the results of experiments verifying that a graphitic carbon electrode having a 99.5% carbon/0.5% EPDM binder composition is an effective compensation for use as a carbon/lithium-ion electrode in a lithium cell. The EPDM percentage of 0.5% is effective for use with most commercial grades of graphitic carbon. Other percentages within the rage of 0.5%–1.0% may also be effective. However, as noted above, the optimal EPDM percentage depends upon the surface area of the graphitic carbon. A different EPDM percentage may be optimal for graphitic carbon having a surface area different from commercial grade. The fabrication process set forth in FIG. 1 can also be applied to forming cathodes for lithium cells. In particular, a 1% EPDM composition is effective in binding titanium disulfide $TiS_2$ to form a cathode.

The graphitic carbon electrodes employed in the experiments illustrated in FIGS. 2–6 were fabricated in accordance with the method set forth in FIG. 1 and the lithium reaction was achieved using a two-step reaction process. The two-step reaction process is one of two reaction methods which will now be described with reference to the remaining figures.

FIG. 7 illustrates a first method for incorporating lithium ions into a graphitic carbon electrode. The method of FIG. 7, is referred to herein as an "intermittent" method. At step 1, an electrical current is applied between a lithium source and a graphitic carbon electrode which are both disposed in an electrolyte bath.

The carbon electrode includes 0.5% EPDM, by weight, and was fabricated according to the method described above. The current is applied until a voltage between the lithium source and the carbon electrode drops to near 0 volts. The electrical current is temporarily deactivated at step 2 and the voltage between the electrodes is allowed to return to stable open circuit voltage (OCV) level.

The application of current at step 1 causes a portion of the lithium ions to react with carbon atoms on the surface of the carbon electrode, without any intercalation. Because the voltage versus lithium-ions of the carbon electrode drops to near 0 volts, it may appear that the electrode is no longer useful. However, steps 1 and 2 are reapplied, preferable three times, at step 3, to repeatedly cause the voltage to cycle. By repeatedly applying current, then deactivating the current to allow the voltage to rise between the electrodes, it has been found that increasing amounts of lithium ions are caused to react with the graphitic carbon electrode. Indeed, following a sufficient number of repetitions, lithium ions were found to be incorporated into the graphitic carbon beyond the 0.5% EPDM binder intercalation threshold of $x=0.046$. Accordingly, the electrode was forced into the reversible stage wherein lithium ions can be reversibly added to, or extracted from, the graphitic carbon.

Figure 8:
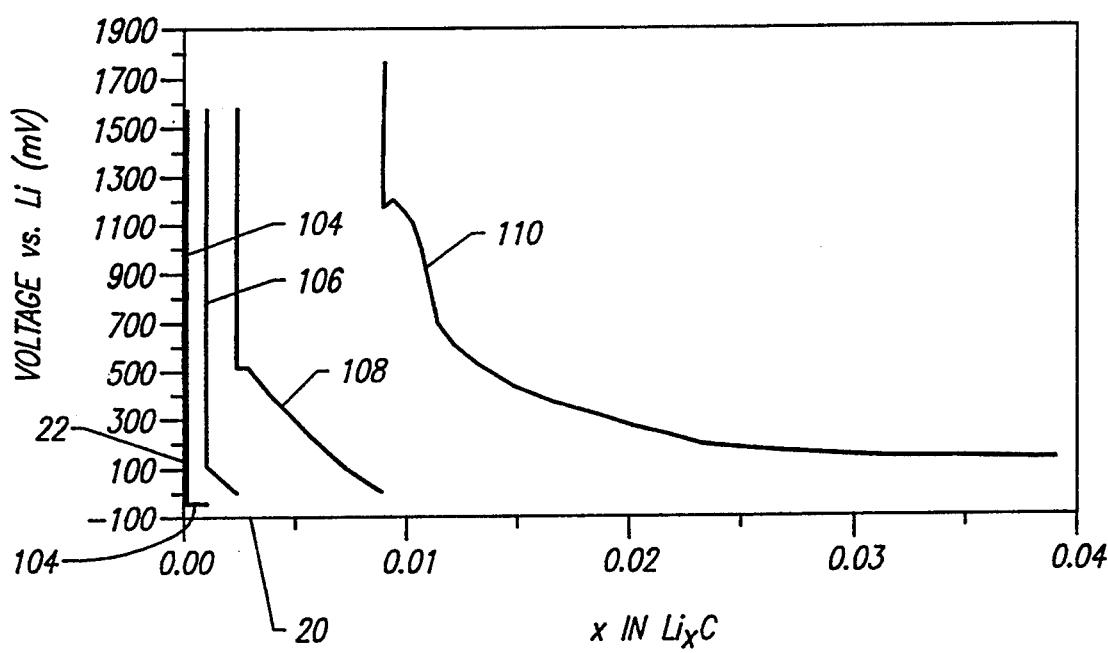
FIG. 8 is a graph illustrating discharge curves of lithium ions reacting with graphitic carbon, in accordance with the intermittent method of FIG. 7.
Figure 9:
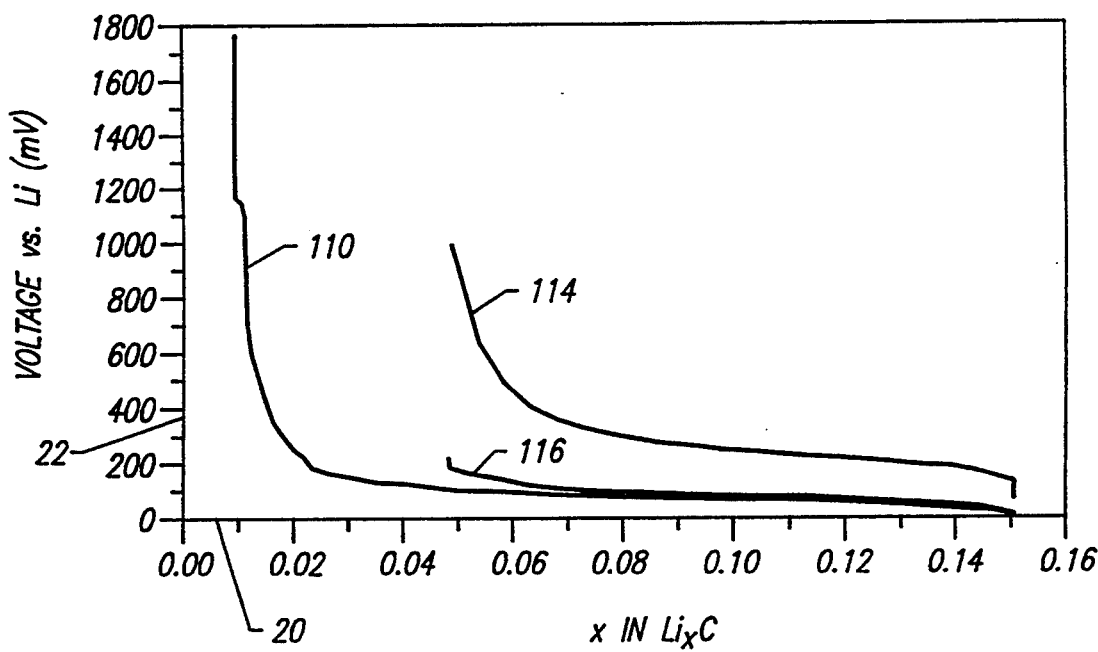
FIG. 9 is a graph illustrating discharge, charge, and redischarge curves for lithium ions reacting with graphitic carbon, also for the intermittent method of FIG. 7.

Experiments verifying the incorporation of lithium into graphitic carbon are illustrated in FIGS. 8 and 9. In FIG. 8, a first stage of lithium incorporation is identified by curve 104. As can be seen, voltage between the electrodes dropped precipitously to below 0 millivolts with little or no incorporation of lithium into the graphitic carbon. The initial voltage level was about 3100 millivolts. For clarity the full range of voltage is not illustrated in FIG. 8. A current of 0.28 milliamperes/cm$^2$ was employed in the experiment. After the current was deactivated, voltage returned to an open circuit voltage of about 1600 millivolts. A subsequent application of 0.28 milliamperes/cm$^2$ of electrical current again caused a precipitous drop in voltage to near 0 volts (curve 106). However, as can be seen from curve 106, a more significant amount of lithium became incorporated into the graphitic carbon with x reaching about 0.0025. A third discharge, 108, shows an increase in lithium reaction to near $x=0.01$. A forth discharge, 110, shows even greater lithium incorporation. Although not illustrated in FIG. 8, lithium incorporation during the forth stage of discharge continued until about $x=0.15$. Hence, the forth stage of discharge achieved a lithium incorporation up to near the theoretical maximum of $x=0.16$. All curves shown in FIG. 8 were measured for an electrical current of 0.28 milliamperes/cm$^2$.

FIG. 9 illustrates a more complete range of x values. Curve 110 of FIG. 8 is repeated in FIG. 9 for an x range extending to $x=0.15$. Thus, curve 110 of FIG. 9 indicates only the fourth stage of the repeated discharge cycle of FIG. 8. As can be seen from curve 110 lithium was incorporated beyond the 0.5% EPDM intercalation threshold to nearly $x=0.15$. Curve 114 illustrates subsequent lithium extraction at a current of 0.84 milliamperes/cm$^2$. Lithium ions were successfully extracted down to $x=0.05$. Thus, curve 114 shows that a reversible intercalation was achieved. The range of reversible capacity is verified by curve 116 which illustrates re-incorporation of lithium ions to the carbon electrode during a subsequent re-discharge stage. Lithium ions were re-incorporated into $x=0.15$. Intercalation up to $x=0.166$ was not achieved because a relatively high current was employed. A lower current would achieve intercalation closer to $x=0.16$.

Referring again to FIG. 8, curve 110 includes a "bump" or "notch" at about 1200 millivolts. When current is deactivated between discharge steps, the voltage vs. lithium should be allowed to rise above 1200 millivolts. If this voltage threshold is not reached, subsequent discharge steps may be ineffective. The voltage level corresponding to the "bump" is a characteristic of the electrode material. Electrodes of differing compositions will likely have a different voltage threshold. In general, the voltage should be allowed to rise to at least the "bump" threshold to ensure effective lithium reaction.

Figure 11:
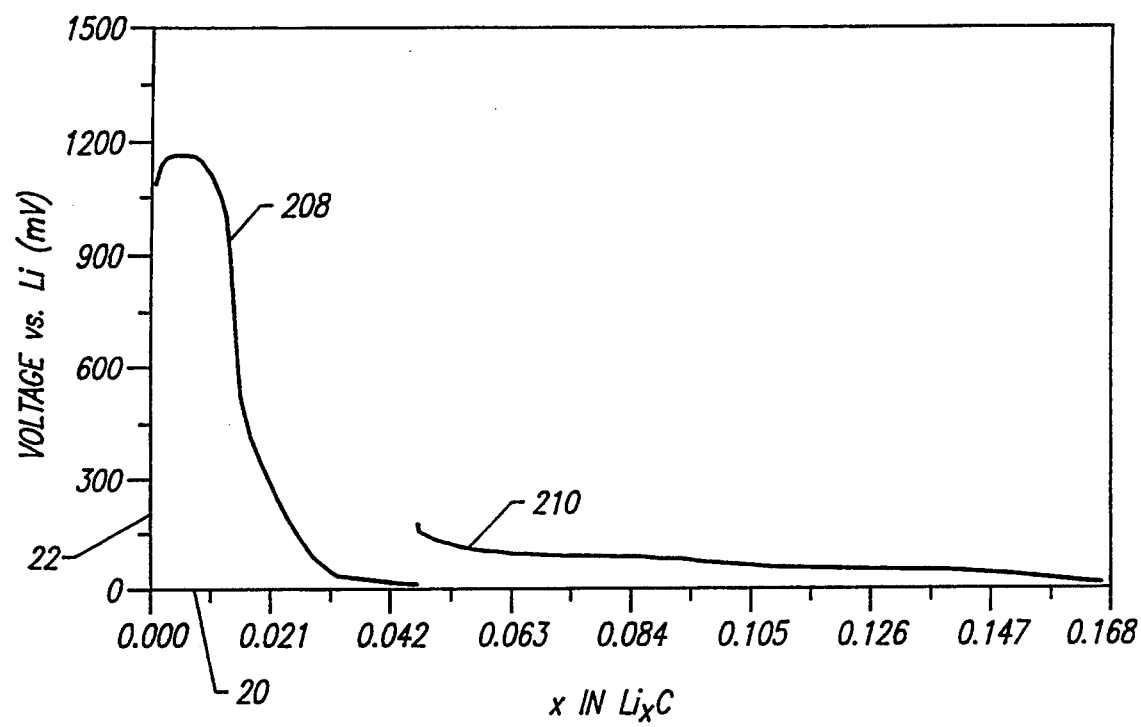
FIG. 11 is a graph illustrating the electrochemical reaction of lithium ions with graphitic carbon for the two-stage method of FIG. 10.
Figure 12:
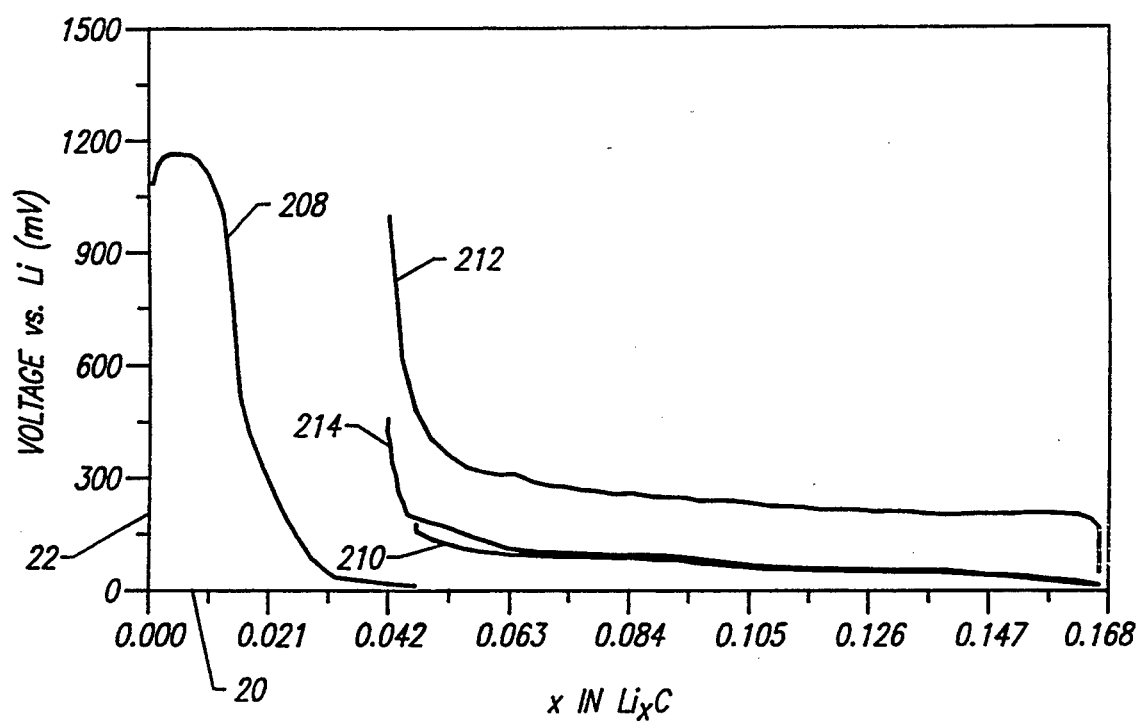
FIG. 12 is a graph illustrating discharge, charge, and redischarge curves of lithium ions reacting with graphitic carbon, also for the two-stage method of FIG. 10.

The method described with reference to FIGS. 7–9 involves a repeated application of a single constant current. FIGS. 10–12 illustrate a second method in which one current is used for an initial discharge stage and then a lower current is used for subsequent discharge stages. Referring first to FIG. 10, a first, relatively high, current is applied at step 1 between a lithium and a graphitic carbon electrode, both immersed in an electrolyte bath. Upon the application of the current, lithium ions are drawn from the lithium source to the carbon electrode causing the voltage between the electrodes to drop to near 0 volts. The current is deactivated, allowing the voltage to return to a stable open circuit voltage. At step 2, a second, lower, current is applied causing more lithium ions to be drawn to the carbon electrode and again causing the voltage to drop to near 0 volts. The current is deactivated and the voltage returns to an open circuit voltage.

An experiment was conducted to verify the incorporation of lithium into the carbon electrode using the two-stage method summarized in FIG. 10. FIGS. 11 and 12 illustrate the results of the experiment. A carbon electrode having 0.5% EPDM fabricated in accordance with the fabrication method described above was employed. In FIG. 11, the electrochemical intercalation of lithium into graphitic carbon is illustrated for a first discharge stage 208 and a second discharge stage 210. During first discharge stage 208, a current of 0.224 milliamperes/cm$^2$ was used. As can be seen, the voltage dropped to near 0 millivolts with x reaching the 0.5% EPDM threshold of about 0.046. Curve 210 illustrates the second discharge stage employing a lower current of 0.0389 milliamperes/cm$^2$. As can be seen, lithium was incorporated into the carbon near the theoretical maximum of $x=0.166$. Thus, by employing a lower current for the second stage, a maximum practical intercalation was achieved in only two discharge stages. For effective intercalation during the second stage, the first stage should reach the intercalation threshold for the composition used. Failure to reach the intercalation threshold during the first stage will likely result in non-optimal intercalation during the second stage.

FIG. 12 illustrates the electrochemical intercalation/deintercalation of lithium ions into and out of graphitic carbon. Curves 208 and 210 illustrate discharge curves illustrated above in reference to FIG. 11. Curve 212 illustrates a charging curve wherein lithium is extracted from the graphitic carbon at a current of 0.158 milliamperes/cm$^2$. As can be seen, lithium ions were extracted down to the 0.5% intercalation threshold of $x=0.046$. Curve 214 illustrates subsequent re-discharge of lithium ions, i.e., curve 214 illustrates lithium ions being returned to the carbon electrode. Lithium ions were re-incorporated up to near the theoretical maximum of x=0.166. Curves 212 and 214 thus provide experimental verification that a full range of reversible capacity was achieved.

What has been described are methods for fabricating carbon electrodes and methods for intercalating the carbon electrodes with lithium ions to form a carbon/lithium-ion electrode for use in a rechargeable lithium cell. The methods yield a carbon/lithium-ion electrode which may be used in a reversible, ambient temperature, lithium cell. Experimental results are provided which verify the success of the techniques. The experiments employed a lithium cell configuration having a composition of (−) Li/1.5M LiAsF$_6$ in 10% EC+90% 2-MeTHF/Li$_x$C(+). However, other alternate anode materials can be evaluated using similar techniques. Furthermore, the various current levels and voltage levels illustrated in the figures are merely exemplary and do not limit application of the invention. Principles of the invention may be employed to other rechargeable lithium cells having properties generally similar to lithium cells.

What is claimed is:

1. A method of preparing a carbon electrode from graphitic carbon powder, said method comprising the steps of:
    a) mixing graphitic carbon powder with a solution containing ethylene propylene diene monomer (EPDM) binder to yield a graphitic/carbon EPDM mixture;
    b) coating a portion of a substrate material with said graphitic carbon/EPDM mixture to form a film;
    c) allowing said film to dry substantially; and
    d) applying pressure to said film on said substrate.

2. The method of claim 1, wherein steps b)–d) are repeated at least once.

3. The method of claim 1, wherein said graphitic carbon and EPDM are mixed to a composition of 99.5% C and 0.5% EPDM, by weight.

4. The method of claim 2, wherein steps b)–d) are repeated until said film structure is formed to a depth of about 10–15 mil with a loading of about 10–15 mg/cm$^2$.

5. The method of claim 1, wherein said pressure is applied to said film at about 450 lbs/in$^2$.

6. The method of claim 1, wherein said substrate material is nickel.

7. A carbon-based material for use in forming an electrode for a lithium cell, said carbon-based material comprising:
    100%−x%, by weight, graphitic carbon particles; and
    x% by weight, ethylene propylene diene monomer, wherein x is less than 1.

8. The material of claim 7, wherein x is about 0.5.

9. The material of claim 7, wherein x is selected to allow for intercalation of said graphitic carbon by lithium ions.

10. A carbon electrode formed from graphitic carbon powder, said electrode formed by:
    a) mixing graphitic carbon powder with a solution containing ethylene propylene diene monomer (EPDM) binder to yield a graphitic/carbon EPDM mixture;
    b) coating a portion of a substrate material with said graphitic carbon/EPDM mixture to form a film;
    c) allowing said film to dry substantially; and
    d) applying pressure to coated surfaces of said substrate.

11. The electrode of claim 10, wherein steps b)–d) are repeated at least once.

12. The electrode of claim 10, wherein said graphitic carbon and EPDM are mixed to a composition of 99.5% C and 0.5% EPDM, by weight.

13. The electrode of claim 11, wherein steps b)–d) are repeated until said film structure is formed to a depth of about 10–15 mil with a loading of about 10–15 mg/cm$^2$.

14. A titanium disulfide-based material for use in forming an electrode for a lithium cell, said titanium disulfide-based material comprising:
    100%−x%, by weight, titanium disulfide particles; and
    x%, by weight, ethylene propylene diene monomer, wherein x is about 1.

15. A method for reacting lithium ions with a carbon electrode to form a carbon/lithium-ion electrode having intercalated lithium ions for use in a rechargeable cell, said method comprising the steps of:
    a) applying a current between a lithium ion source and a carbon electrode disposed in an electrolyte bath, until a voltage between said electrodes drops from an open circuit voltage level to near 0 volts, said application of current causing a reaction of said lithium with said carbon;
    b) deactivating said current until said voltage between said electrodes returns to a stable open circuit voltage; and
    c) repeating steps a) and b) a plurality of times to cause the carbon to become intercalated with lithium ions.

16. A method for intercalating lithium ions into carbon, comprising the steps of:
    a) applying a constant current to a carbon electrode disposed in an electrolyte bath with a lithium source;
    b) deactivating said current to allow a voltage between the carbon electrode and the lithium ion source to return to an open circuit voltage; and
    c) repeating steps a) and b) a desired number of times to cause the carbon electrode to become intercalated with lithium ions to yield Li$_x$C, wherein x is between 0 and 1/6.

17. The method of claim 16,, wherein steps a) and b) are repeated three times.

18. The method of claim 16, wherein step a) is performed until a voltage between the carbon and the lithium decreases from an upper level to substantially 0 volts.

19. The method of claim 16, wherein steps a) and b) are repeated until the carbon becomes intercalated with lithium to yield Li$_x$C, wherein x is substantially 0.16.

20. A method for causing a carbon electrode to become intercalated with lithium, said method comprising the steps of:
    applying a first current to said carbon electrode, said current being selected to cause a surface reaction of said carbon with said lithium;
    deactivating said current; and
    applying a second current, said second current causing said carbon to become intercalated with said lithium.

21. The method of claim 20, wherein said second current is substantially the same as said first current.

22. The method of claim 20, wherein said second current is substantially lower than said first current.

23. A method for processing a carbon electrode comprising the steps of:

a) applying a constant current through a carbon electrode disposed in an electrolyte bath along with a lithium ion source;

b) deactivating said current; and c) repeating steps a) and b) at least once to cause the carbon electrode to become intercalated with lithium yielding $Li_xC$, wherein x is between 0.0 and 0.16.

24. The method of claim 23 wherein step a) is performed until a voltage between said electrodes drops from a first voltage level to about 0 volts.

25. The method of claim 23, wherein step b) is performed until said voltage returns to a stable open circuit voltage level.

26. The method of claim 23, wherein step c) is performed three times.

27. The method of claim 23, wherein step a) is performed a first time to cause a surface reaction of lithium ions with carbon and repeated to cause an intercalation of lithium ions into the carbon.

28. The method of claim 23, wherein said carbon is graphitic carbon.

29. The method of claim 23, wherein step c) is repeated until x is about 0.166.

30. A method of processing a carbon electrode comprising the steps of:

applying a first current to an electrode disposed in an electrolyte bath along with a lithium ion source, said current being selected to cause a surface reaction of said electrode with lithium ions;

deactivating said current; and applying a second current, said second current causing said electrode to become intercalated with said lithium ions.

31. The method of claim 30, wherein said second current is substantially the same as said first current.

32. The method of claim 30, wherein said second current is lower than said first current.

33. The method of claim 30, wherein said electrode is a carbon-based electrode.

34. The method of claim 33, wherein the carbon-based electrode includes about 99.5%, by weight, carbon and 0.15%, by weight, ethylene propylene diene monomer (EPDM).

* * * * *